May 26, 1925.
A. L. GENTER
1,538,980
CONTINUOUS VACUUM FILTER
Filed April 9, 1918
2 Sheets-Sheet 1
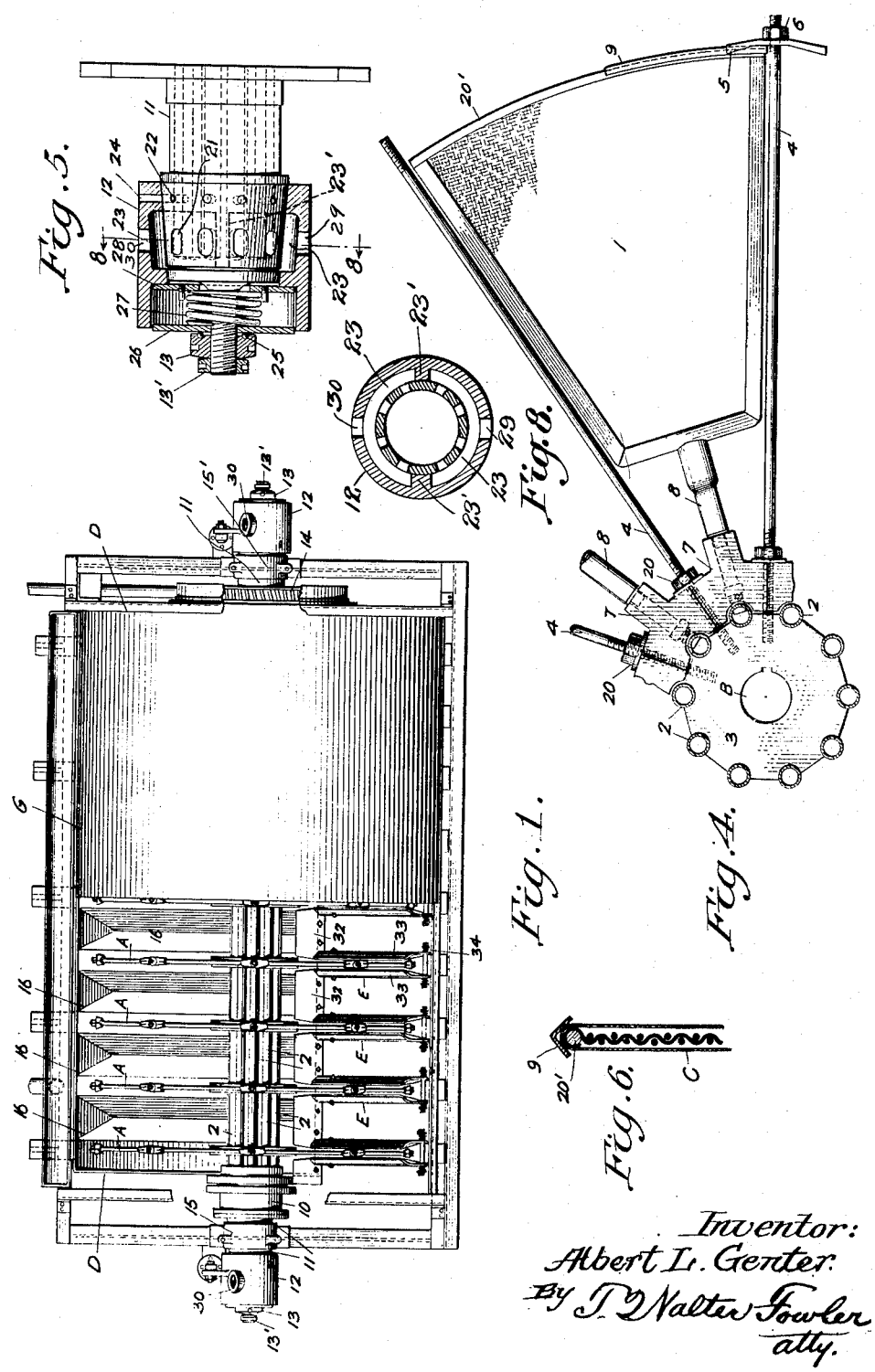
Inventor:
Albert L. Genter.
By T. Walter Fowler
atty.

May 26, 1925.
A. L. GENTER
CONTINUOUS VACUUM FILTER
Filed April 9, 1918
1,538,980
2 Sheets-Sheet 2
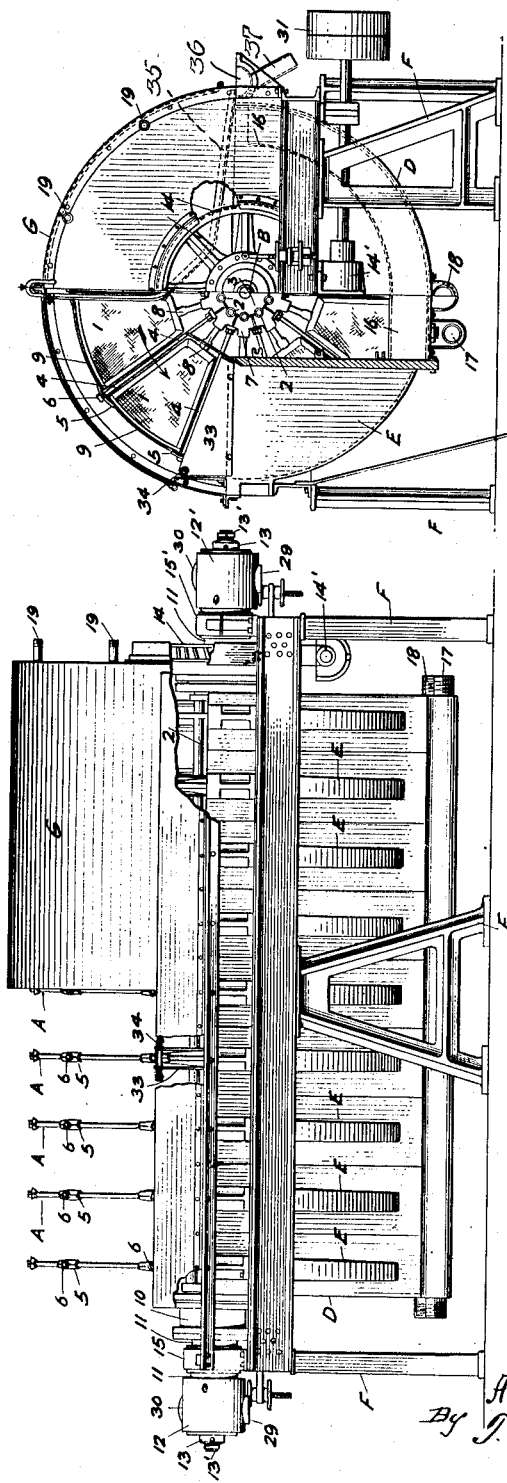
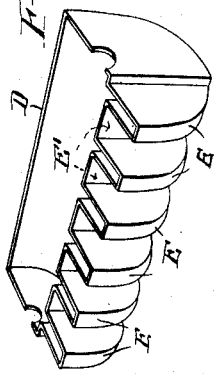
Inventor:
Albert L Genter
By T. Walter Fowler
atty.

Patented May 26, 1925.

1,538,980

UNITED STATES PATENT OFFICE.

ALBERT LEGRAND GENTER, OF SALT LAKE CITY, UTAH, ASSIGNOR TO UNITED FILTERS CORPORATION, OF SALT LAKE CITY, UTAH, A CORPORATION OF DELAWARE.

CONTINUOUS VACUUM FILTER.

Application filed April 9, 1918. Serial No. 227,519.

*To all whom it may concern:*

Be it known that I, ALBERT L. GENTER, a citizen of the United States, residing at Salt Lake City, in the county of Salt Lake and State of Utah, have invented certain new and useful Improvements in Continuous Vacuum Filters, of which the following is a specification.

This invention relates to improvements in filters adapted for use in the separation of solids held in suspension in a liquid, and more especially to filters of the continuous vacuum type such as is shown, for example, in the patent to O. J. Salisbury, No. 1,259,139, dated March 12, 1918.

The invention has for its object to provide a filter of this character which is comparatively simple in construction and efficient in operation. Further, the invention has for its object to provide a filter the several parts of which may be readily removed for purposes of cleaning, repairing or replacing the same without the necessity of removing other of such parts of the filter.

In the accompanying drawings forming part of this specification, wherein I have shown a preferred embodiment of my invention for the purpose of illustrating the principle thereof, Figure 1 is a plan view of a filter constructed in accordance with and embodying my invention, one half of the cover G being removed;

Figure 2 is a side elevation thereof, parts being broken away;

Figure 3 is an end view thereof, parts being broken away;

Figure 4 is an enlarged detail sectional view showing the sectional shaft and parts associated therewith, including one of the filter disc sections;

Figure 5 is an enlarged detail of the rotary suction valve and housing for same;

Figure 6 is a detail sectional view of a portion of a filter disc section, and

Figure 7 is a detail perspective view of the filter tank.

Figure 8 is a sectional view approximately on the line 8—8 of Figure 5.

Referring to the drawings, the filter is shown as comprising a plurality of spaced sectional filter discs A carried by a built-up or sectional horizontal shaft consisting of a central shaft member B and a plurality of longitudinally-extending pipes or conduits 2 supported upon collars 3 secured to the central shaft B in spaced relation to one another, there being as many collars 3 as there are filter discs A, and there being as many pipes 2 as there are sections in each filter disc. The pipes 2 are removably secured in position upon each of the several collars 3 by means of a series of clamps 7 held in engagement with the collars by nuts 20 mounted upon the threaded inner ends of radial rods 4, which inner ends pass through openings formed by oppositely-disposed registering recesses in the abutting end surfaces of adjacent clamps and are threaded into the collars. The clamps 7 are thus held securely in position as the nuts 20 serve to hold them firmly seated upon the collars 3 and rods 4 prevent endwise or sidewise movement of the same. Each clamp has a centrally-positioned radial port extending therethrough, provided at its inner end with a nipple adapted to pass through a corresponding port formed in the pipe 2 with which the clamp is associated, as clearly shown in Figure 4.

Each of the filter discs A, which are constructed as shown in the patent to O. J. Salisbury, No. 1,293,555, dated February 4, 1919, are formed of a plurality of sections 1 comprising a rigid frame enclosed within a bag C, formed of suitable filtering fabric, within which is positioned screening or reticulated metal corresponding in shape and size to the frame to which it is secured. The screening serves to hold the sides of the bag C spaced from one another to form a drainage area communicating at its inner end with one of a nipple 8, the other end of which is adapted to extend within the outer end of the port formed in the clamp 7 with which the filter disc section is associated, and to form a fluid tight joint therewith. The bags C, which are open at their outer ends, are held closed, when in operative position, by folding the free end portions over the outer rims 20′ of the frames in overlapping relation to one another and holding them in such position by means of clamping members 9, formed of angle-iron secured in place by clamps 5 carried upon the outer ends of the rods 4. The clamps 5 are maintained in position by means of nuts 6 threaded upon the outer ends of the rods 4, and it will be understood that as the nuts 6 are screwed upon the rods 4 the clamps 5 will be forced downwardly to cause the clamping members 9 to be pressed firmly against the overlapping end portions of the bag to hold the same securely in place, and at the same time the filter-disc sections will be forced inwardly to insure a tight joint between the nipples 8 and the ports in the clamps 7 with which they engage. To remove any one of the filter disc sections, it is merely necessary to unscrew the bolts 6 upon the outer ends of the rods 4 at the sides of the section sufficiently to permit the clamps 5 to be moved out of engagement with the clamping member 9, the clamps 5 may be rotated upon the rods through an angle of ninety degrees to permit the filter section to be removed.

At each of its ends the sectional shaft is connected to a reducing pipe 10 having longitudinal passages formed therein communicating with the pipes 2 and with corresponding passages formed in valve members 11 to which the reducing pipes 10 are connected. Each of the valve members 11 has a tapered inner end received within a housing 12, the outer wall of which is spaced from the tapered surface by the partition walls 23' to form filtrate and wash water chambers 23, the filtrate chamber being provided with an outlet 29 at the lower portion thereof and the wash water chamber being provided with an outlet 30 adjacent the upper portion thereof. These outlets are adapted to be connected to suitable suction apparatus. The tapered end portion of each valve member 11 is provided with two series of radially-extending ports 21 and 22, communicating at their inner ends with the passages formed in the valve member. At their outer ends the ports 21 communicate successively with the chambers 23 within the housing 12, and the outer ends of the ports 22 are caused to successively register with a port 24, formed in the housing 12 adapted to be connected with a source of fluid, such as air, under pressure.

In order to insure a tight joint between the housing 12 and the tapered end of the valve member 11 the latter is provided with an outwardly extending threaded stem carrying a nut 13 and a lock nut 13' at its outer end. Mounted upon the stem adjacent the inner face of the nut 13 and spaced therefrom by a ball race 25 is an annular plate 26 against which bears one end of a compression spring 27. The other end of the spring 27 engages an annular plate 28 engaging the outer surface of the outer annular wall of the chamber 23. It will be understood that by tightening the nut 13 the spring 27 will be compressed and the pressure due to such compression will force the housing inwardly with respect to the tapered end of the valve member.

The sectional shaft is rotatably supported within suitable bearings 15 and 15' upon a suitable frame F and rotation of the shaft, together with the filter discs A is effected in any suitable manner. As shown a worm gear 14 secured to the valve member 11 at one end of the shaft meshes with a worm 14' fixed to one end of a shaft, to the other end of which is secured a pulley 31 or other suitable power transmission means.

The tank D is provided with a main chamber at one side thereof extending throughout the entire length of the tank and having a uniform cross-sectional area throughout its length. This chamber is substantially in the form of a quarter cylinder open at the top and having a curved side wall, a vertical side wall, and substantially quadrant-shaped end walls. The upper surfaces of the chamber walls lie in a plane parallel to a horizontal plane passing through the axis of the shaft and the vertical side wall lies in a plane parallel to a vertical plane passing through the axis of the shaft. The tank further includes a plurality of individual, trough-shaped chambers spaced from one another in the direction of the length of the tank and communicating with the main chamber through openings formed in the vertical wall thereof. As shown these individual chambers are formed as separate castings E secured to the vertical side wall of the main chamber and registering with openings formed therein, the open tops of the chambers lying in the same plane as the open top of the main chamber. The individual chambers are positioned to register with the several filter discs and the parallel walls thereof are spaced apart sufficiently to permit the discs to rotate freely without danger of striking against the chamber walls. It will be seen from the above description that the tank D may be considered to be in the form of a semi-cylinder having one side thereof crenellated or recessed by the inwardly extending, longitudinally-spaced recesses E' formed therein, and that the tank thus formed comprises a main chamber adapted to receive all of the filter discs, and a plurality of individual chambers communicating with the main chamber and adapted to receive the several filter discs individually. The mixture to be filtered is delivered to the tank through a pipe 18 communicating with the main chamber of the tank adjacent the lower portion thereof. In order to prevent the mixture from overflowing, triangular pipes 16 are positioned within the main chamber of the tank between adjacent filter discs, the upper ends of the pipes terminating a short distance below the top of the tank and the lower ends thereof being in communication with an overflow discharge pipe at the bottom of the tank. The pipes 16 constitute wedge-shaped settling deflectors and serve to cause any substance, which has a tendency to settle out of the mixture, to travel toward the filter discs and to be deposited upon the surfaces thereof.

In order to remove the filter cake which is deposited upon the outer surfaces of the filter discs, flexible scrapers 33 are mounted upon the side walls of the individual chambers at the upper edges thereof, and these scrapers are maintained in yielding engagement with the filter discs by means of springs 34 carried by bolts passing through the scrapers adjacent their outer ends. The filter cake which is removed from the filter discs by the scrapers 33 will fall down through the recesses E' between the individual chambers of the tank and may be received within a hopper, conveyor or other suitable receptacle. Deflecting plates 32, which are mounted upon the vertical wall of the main chamber between adjacent individual chambers, serve to prevent the filter cake which is removed by the scrapers 33 from falling into the tank D.

As the filter discs emerge from the main chamber of the tank, water in a finely atomized condition is sprayed upon the filter cake through suitable pipes 19. In order to collect the drippings, a trough 36 is positioned along the side of the tank at the top of the main chamber thereof to which the drippings are delivered by means of the channeled members 35. The trough 36 is provided with a spout 37 adapted to be connected to a suitable receptacle for receiving the drippings.

If desired, the filter may be provided with a cover or housing G which may be made of roll curtains supported upon a suitable frame-work. Such a housing is particularly desirable if the mixture is to be filtered while hot.

The filtrate and wash-water chambers 23 and the ports 24 within the housings 12 are so positioned and arranged that the drainage areas of the sections of the filter discs which are immersed in the mixture within the tank will be in communication with the filtrate chambers, the drainage areas of the filter sections subjected to the wash-water will be in communication with the wash-water chambers, and the drainage areas of the filter sections subjected to the action of the scrapers will be in communication with the ports 24.

During the operation of the filter, the liquid portion of the mixture within the tank will drain by suction through the filter fabric of the filter sections immersed in the mixture and into the drainage areas, thereof from which it passes through the pipes 2 to the filtrate chambers within the housings 12 and is discharged through the outlets 29. At the same time the solids suspended in the liquid will be deposited upon the filter fabric in the form of a filter cake. As the filter sections emerge from the tank they are sprayed by the wash-water, and the drainage areas thereof which were previously in communication with the filtrate chambers of the housings 12 will now be in communication with the wash-water chambers. As the outlets 30 of the wash-water chambers are subjected to suction, the wash water will be drawn through the filter cakes and filter fabric into the drainage areas of the several filter sections. The wash-water, which in passing through the filter cakes carries with it any values which may be retained thereby, flows from the drainage areas through the pipes 2 into the wash-water chamber within the housing 12 and is discharged through the outlet 30. After having been subjected to the wash-water spray the filter sections are moved into engagement with the scrapers 33 and at such time the drainage areas of the filter sections are in communication with the ports 24, which are connected to a source of fluid under pressure. As the fluid under pressure enters the drainage areas of the filter sections the filter fabric will be caused to bulge outwardly against the scrapers 33. As the filter discs rotate the scrapers will remove the filter cake from the surfaces thereof, and the filter cake which has thus been removed from the filter discs will fall down through the recesses E' between the individual chambers of the tank, into a conveyor hopper or other suitable receptacle. As the scrapers are held in yielding engagement with the filter discs by the springs 34, they will conform to the contour of the bulged filter fabric thus insuring that all of the filter will be removed therefrom without any material wear of the fabric. After the filter sections have been cleaned in this manner they again enter the tank and the operation is repeated.

From the above description it will be seen that the filter embodying my invention is simple in construction and efficient in operation. Furthermore, the removal of any of the parts thereof for the purposes of cleaning, repairing or renewal may be readily and quickly effected. Should it be necessary to remove any one of the filter disc sections it is merely necessary to loosen the associated clamps 5 by unscrewing the nuts 6 sufficiently to permit the clamps to be given a quarter turn, whereupon the section may be withdrawn from its position. If it is desired to remove any one of the pipes 2, it is merely necessary to remove the several sections of the filter discs which are associated with the pipe and then to remove or loosen the corresponding clamps 7 to permit of the withdrawal of the pipe. It will thus be seen that any filter section or any pipe may be removed independently of the remaining filter sections or pipes and without in any way disturbing the same. By constructing the tank in the form of a semi-cylinder crenellated or recessed at one side thereof to form individual chambers upon which the filter cake scrapers are supported, the filter cake which is removed from the filter discs will fall through the recesses between the individual chambers and is positively prevented from falling into the tank.

While I have illustrated and described my invention in connection with a preferred embodiment thereof, it will be understood that I do not intend to limit myself to the specific embodiment shown, but that I intend to cover my invention broadly in whatever form its principles may be employed.

Having thus described my invention what I claim as new and desire to secure by Letters Patent is:

1. A filtering apparatus having a rotatable shaft, a plurality of filter discs supported thereon in spaced relation to one another, and a tank in which said discs rotate, said tank including a chamber extending longitudinally of the shaft and adapted to receive the discs collectively, and a plurality of longitudinally spaced chambers communicating with said unitary chamber and adapted to receive the discs individually.

2. In a filtering apparatus, a central shaft including a plurality of conduits extending the length of said shaft and located around the same, means to space said conduits radially from said shaft, and a plurality of independent filter disks detachably mounted upon said shaft surrounding said spacing means and including a plurality of sections communicating with said conduits.

3. A filtering apparatus having a rotatable shaft including a plurality of detachable longitudinally extending conduits, a plurality of spaced collars on said shaft and supporting said conduits in spaced relation thereto, filter discs mounted upon said collars and communicating with said conduits, a valve member operatively connected to one end of the shaft having passages registering with the conduits of the shaft, said valve member being provided with two series of ports communicating with the passages in the valve member, and a housing for the valve member having spaced ports, one of the ports of the housing cooperating with the ports of one of said series, and the other port of the housing communicating with the ports of the other of said series.

4. In a filter apparatus, a rotatable shaft, a plurality of spaced, radially-extending supporting members secured thereto, a plurality of longitudinally-extending conduits supported by said supporting members, and a plurality of filter discs carried by said supporting members and communicating with said conduits.

5. In a filter apparatus, a rotatable shaft, a plurality of spaced radially-extending supporting members secured thereto, a plurality of longitudinally-extending conduits supported by said supporting members, clamping members for holding said conduits in position, filter discs mounted upon said clamping members and communicating with said conduits, and means for removably holding said clamping members and said filter discs in position.

6. A filtering apparatus having a rotatable shaft, filter discs supported thereon in spaced relation to one another, a tank including a main chamber to receive all of the discs and a plurality of longitudinally-spaced supplementary chambers communicating with said chamber and receiving the discs individually, and means for removing the deposited filter cake from the filter discs and directing it into the spaces between said supplementary chambers.

7. A filtering apparatus, having a series of similar sectionalized filtering discs arranged side by side in spaced relation, a longitudinally sectionalized hollow central shaft the sections whereof communicate with the sections of said discs, a tank in which the discs rotate, said tank being substantially straight on one longitudinal side and provided with recesses along the opposite longitudinal side, said recessed side resulting in disc-receiving portions which extend at right angles to the said central shaft, the sides of the disc-receiving portions being parallel to and conforming substantially with the surfaces of said filtering discs.

8. A filtering apparatus, having a series of similar sectionalized filtering discs arranged side by side in spaced relation, a central shaft rotatably mounted and supporting said discs and comprising a series of hollow longitudinal sections communicating with the sections of the discs, a tank substantially straight on one longitudinal side and provided with recesses on the opposite side, said recessed side resulting in disc-receiving portions which extend at right-angles to the central shaft, the sides of said disc-receiving portions being parallel to and conforming substantially with the surfaces of the sections of said discs, and disposed in close proximity thereto.

9. A filtering apparatus comprising a series of similar sectionalized filtering discs arranged side by side in spaced relation, a central ported shaft supporting said discs and including a series of hollow longitudinal sections communicating with the discs, said shaft terminating in a collecting valve, and a tank in which the filtering discs and shaft are mounted, said tank having one of its longitudinal sides provided with disc-receiving portions substantially conforming to the outer surfaces of the filter discs on the cake discharge side thereof.

10. A filtering apparatus comprising a series of substantially similar sectionalized filter discs arranged side by side in spaced relation, a rotatable central shaft including longitudinal hollow sections communicating with said discs, a series of radial collars attached to the shaft, said discs being mounted upon the collars and said collars having means for clamping the discs to the sectionalized central shaft, and a tank in which the discs are mounted, said tank having on its cake discharge side disc-receiving portions conforming substantially to and in close proximity to the outer surfaces of the discs.

11. A filtering apparatus comprising a series of substantially similar sectionalized filtering discs arranged side by side in spaced relation, a rotatable central shaft including longitudinal hollow sections communicating with said discs, a series of radial collars attached to the shaft, said discs being mounted upon the collars and said collars having means for clamping the discs to the sectionalized central shaft, a tank in which the discs are mounted, said tank having on its cake discharge side disc-receiving portions conforming substantially to and in close proximity to the outer surfaces of the discs, and cake deflectors or scrapers on the sides of said disc-receiving portions.

12. A filtering apparatus comprising a series of substantially similar sectionalized filtering discs arranged side by side in spaced relation, a rotatable central shaft including longitudinal hollow sections communicating with said discs, a series of radial collars attached to the shaft, said discs being mounted upon the collars and said collars having means for clamping the discs to the sectionalized central shaft, a tank in which the discs are mounted, said tank having on its cake discharge side disc-receiving portions conforming substantially to and in close proximity to the outer surfaces of the discs, and cake deflectors or scrapers on the sides of said recesses, said deflectors or scrapers being disposed parallel to and adjacent the outer surfaces of said filtering discs.

13. A filtering apparatus having a series of substantially similar sectionalized filtering discs arranged side by side in spaced relation, a longitudinally sectionalized hollow central shaft communicating with the filtering discs and supporting the latter, a tank in which the discs rotate, said tank being straight along one longitudinal side and provided with disc-receiving portions on the opposite side, which extend at right angles to the central shaft, the sides of said disc-receiving portions being in proximity to and conforming substantially with the outer surfaces of the filtering discs, cake deflectors or scrapers on the sides of the disc-receiving portions in proximity to the outer sides of the discs, the distance between the disc-receiving portions being sufficient to permit discharged cake passing over said deflectors to fall down into the spaces formed between the outer sides of the disc-receiving portions.

14. A filtering apparatus comprising a sectionalized shaft the sections whereof are hollow and constitute a multiplicity of longitudinal filtrate passages, a collecting valve in which said passages terminate, a tank, a series of sectionalized filter units in the tank and communicating with said passages, said tank having its cake discharge side provided with a series of disc-receiving portions and scrapers on said cake discharged side of the tank for discharging the cake.

15. A filtering apparatus comprising a sectionalized shaft the sections whereof are hollow and constitute a multiplicity of longitudinal filtrate passages, a collecting valve in which said passages terminate, a tank, a series of sectionalized filter units in the tank and communicating with said passages, said tank having its cake discharge side provided with a series of disc-receiving portions and scrapers on said cake discharge side of the tank for discharging the cake, said scrapers being positioned above the liquid level in the tank.

16. A filtering apparatus comprising a central sectionalized shaft the sections whereof are hollow and extend lengthwise of the shaft and constitute a multiplicity of filtrate passages, collecting filtrate and washwater valves at both ends of said passages, a tank, a series of similar sectionalized filter units mounted in the tank, said tank having disc-receiving portions along one of its longitudinal sides, and scrapers on the cake discharge side of the tank.

17. A filtering apparatus comprising a central sectionalized shaft the sections whereof are hollow and extend lengthwise of the shaft and constitute a multiplicity of filtrate passages, collecting filtrate and washwater valves at both ends of said passages, a tank, a series of similar sectionalized filter units mounted in the tank, said tank having disc-receiving portions along one of its longitudinal sides, scrapers on the cake discharge side of the tank, and angular settling deflectors in the tank between the filtering units.

18. A filtering apparatus comprising a sectionalized shaft the sections whereof are hollow and extend lengthwise of the shaft and constitute a multiplicity of filtrate passages, a filtrate and wash-water collecting valve at one end of the passages, a tank, a series of sectionalized filter units operable in the tank and communicating with said passages, said tank having one of its longitudinal sides provided with disc-receiving portions, and means for overflowing unfiltered material between the filtering units.

19. A filtering apparatus comprising a sectionalized shaft the sections whereof are hollow and extend lengthwise of the shaft and constitute a multiplicity of filtrate passages, filtrate and wash-water valves at the ends of said passages, a tank having a cake discharge side provided with disc-receiving portions, a series of sectionalized filter units in said tank communicating with said passages, scrapers on the cake discharge side of the tank, settling deflectors and circulation overflow means between the filtering units.

20. A filtering apparatus comprising a sectionalized shaft the sections whereof are hollow and extend lengthwise of the shaft and constitute a multiplicity of filtrate passages, filtrate and wash-water valves at the ends of said passages, a tank having a cake discharge side provided with disc-receiving portions, a series of sectionalized filter units in said tank communicating with said passages, scrapers on the cake discharge side of the tank, settling deflectors, and circulation overflow means between the filtering units, and means for clamping the sections of the filtering units firmly in place, said means including radial arms connected to shaft and having devices at the outer portions for engaging the outer circumference of the filtering units.

21. A filtering apparatus comprising a central shaft having a series of independent pipes extending longitudinally of the shaft and constituting a multiplicity of fluid conductors, fluid collecting valves communicating with the ends of the pipes, a series of sectionalized filtering units the sections whereof communicate with said pipes, a tank in which the filter units are rotatably mounted, said tank having disc-receiving portions along its cake-discharge side and having its opposite side devoid of disc-receiving portions, circulation overflow means on the second named side of the tank, means for removing deposited solids from the filter units on the cake discharge side of the tank, and means for clamping the filtering units firmly in place, said last named means including radial arms connected to the central shaft and having clamps on their inner ends adapted to firmly hold in place said longitudinal fluid conducting pipes.

22. A filtering apparatus comprising a central shaft having a series of independent pipes extending longitudinally of the shaft and constituting a multiplicity of fluid conductors, fluid collecting valves communicating with the ends of the pipes, a series of sectionalized filtering units the sections whereof communicate with said pipes, a tank in which the filter units are rotatably mounted, said tank having disc-receiving portions along its cake-discharge side and having its opposite side devoid of disc-receiving portions, circulation overflow means on the second named side of the tank, means for removing deposited solids from the filter units on the cake discharge side of the tank, and means for clamping the filtering units firmly in place, said last named means including radial arms connected to the central shaft and having clamps on their inner ends adapted to firmly hold in place said longitudinal fluid conducting pipes, each of said clamps extending to both sides of its associated pipe half way to the adjacent pipes.

23. A filtering apparatus comprising filter discs formed of segmental sections, a central shaft having fluid passages, radial rods and clamps thereon engaging the peripheral edge of the sections, fluid conducting nipples on the inner portions of the sections, a sectionalized radial clamp to the sections of which the nipples are fitted, means connecting the sectional clamp to the central shaft, detachable connections permitting the removal of any section without disturbing the other sections of the same leaf, and a tank in which the filter discs are mounted.

24. In a filter of the rotating leaf type, a tank having one of its longitudinal sides recessed at points to form intermediate rigid trough-shaped portions which are open along their top and inner edges for the reception of a rotatable filter leaf.

25. In a filter of the rotating leaf type, a tank having one of its longitudinal sides recessed to form intermediate rigid trough-shaped portions which are open along their top and inner edges for the reception of rotatable filter leaves, said trough-shaped portions being spaced apart to provide intermediate discharge passages for the exterior discharge of formed cake.

26. In a filter of the rotating leaf type, a casing comprising a tank one portion of which at one side of the longitudinal center of said tank constitutes a unit receptacle for a plurality of filter leaves and the other portion at the opposite side of said longitudinal center is recessed at points to form intermediate rigid trough-shaped portions which are open along their top and inner edges for the reception of rotatable filter leaves.

27. In a filter of the rotating leaf type, a casing, a central shaft adapted to support a plurality of filtering elements, said shaft being provided with a plurality of separable fluid passages extending longitudinally thereof, and collecting valves communicating with the ends of the passages.

28. In a filter of the rotating leaf type, a sectionalized central shaft comprising a plurality of fluid pipes extending longitudinally thereof and means for supporting said pipes in annular arrangement, collecting valves communicating with the end of the pipes and sectionalized filtering units mounted upon the shaft, a section of each unit being in communication with one of the pipes.

29. In a filter of the rotating leaf type, a sectionalized central shaft comprising a plurality of fluid passages extending longitudinally thereof, collecting valves communicating with the ends of the passages, a series of filter sectionalized units mounted on the shaft and communicating with said passages, and a casing having a quartered cylindrical surface spaced from the peripheral extremities of the filter leaves and united trough-shaped pans adapted to receive said leaves, said pans being spaced apart to provide passages for the exterior discharge of the cake from the filter leaves.

30. In a filter of the rotating leaf type, a substantially semi-cylindrical filter tank, divided approximately on the vertical axial plane thereof into a portion adapted to receive all the leaves and a plurality of spaced portions communicating therewith and each adapted to receive a single leaf.

In testimony whereof I affix my signature.

ALBERT LEGRAND GENTER.